Dec. 24, 1968 N. A. ANSTEY 3,418,625
METHODS AND APPARATUS FOR ATTENUATING THE EFFECTS
OF MULTIPLE SEISMIC REFLECTIONS
Filed Nov. 15, 1965 5 Sheets-Sheet 1

INVENTOR
NIGEL ALLISTER ANSTEY
BY
Mason, Kolehmainen, Rathburn and Wyss
ATTORNEYS Prior Art
Fig. 4.

INVENTOR
NIGEL ALLISTER ANSTEY
BY
Mason, Kolehmainen, Rathburn and Wyss
ATTORNEYS

Dec. 24, 1968 N. A. ANSTEY 3,418,625
METHODS AND APPARATUS FOR ATTENUATING THE EFFECTS
OF MULTIPLE SEISMIC REFLECTIONS
Filed Nov. 15, 1965 5 Sheets-Sheet 5

Fig. 12.

INVENTOR
NIGEL ALLISTER ANSTEY
BY
Mason, Kolehmainen, Rathburn and Wyss.
ATTORNEYS United States Patent Office 3,418,625
Patented Dec. 24, 1968

3,418,625
METHODS AND APPARATUS FOR ATTENUATING THE EFFECTS OF MULTIPLE SEISMIC REFLECTIONS
Nigel Allister Anstey, Orpington, Kent, England, assignor to Seismograph Service Corporation, Tulsa, Okla.
Filed Nov. 15, 1965, Ser. No. 507,953
Claims priority, application Great Britain, Nov. 13, 1964, 46,449/64
20 Claims. (Cl. 340—15.5)

ABSTRACT OF THE DISCLOSURE

An echo ranging system and method wherein multiple reflections are attenuated by passing a received signal including the multiple reflections through a given stage and then to a feedback loop extending around the stage. The latter loop includes a correlator having a pattern representing at least a portion of the received signal reversed in time for correlation with the received signal to produce a feedback signal or correlation output which is applied to the input of the stage. The resulting output from the stage represents the received signal with the multiple reflections attenuated.

---

This invention is concerned with the attenuation of multiple reflections in echo-ranging techniques. It has for its principal object the provision of novel and improved methods of and apparatus for doing this.

The methods and apparatus of the invention are applicable to and can be used in, inter alia deep echo sounding, ultrasonic flaw detection and ionospheric sounding. The invention will, however, here be described with particular reference to the seismic reflection method of exploring the earth's crust.

For the better understanding of the invention and the problems involved reference will first be made to FIGURES 1 to 7 of the accompanying drawings, in which.

Prior-art techniques for the attenuation of multiple reflections may be divided under three headings; namely the common-depth point method, the feed-forward method and the feed-back method.

The common-depth-point method uses the increase of average seismic velocity with depth to distinguish between primary reflections and multiple reflections which may arrive at the surface at the same time. In practice this involves the addition or stacking of many seismic traces representing widely-separated ray paths to a common depth-point. The method is described by Mayne in U.S. patent specification No. 2,732,906.

Figure 1:
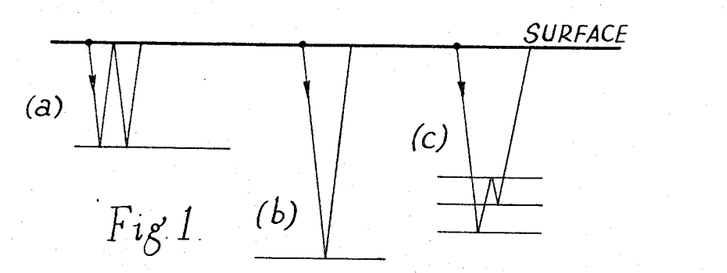
FIGURE 1 shows diagrammatically three seismic signals which are reflected by one or more sub-surface interfaces.

This method suffers from a practical disadvantage in that it involves a manifold repetition of the field work, together with long and cumbersome spreads of detectors. It has also a more fundamental limitation in that, while it can be made to distinguish clearly between a primary reflection of the type shown in FIGURE 1b of the accompanying drawings and multiple reflections of the type shown in FIGURE 1a, arriving at the same time, it is seldom feasible to distinguish between the primary of FIGURE 1b and the multiple of FIGURE 1c. The effect of this limitation is that the method works well only for multiple reflections which include at least one bounce at or near the surface.

Figure 4:
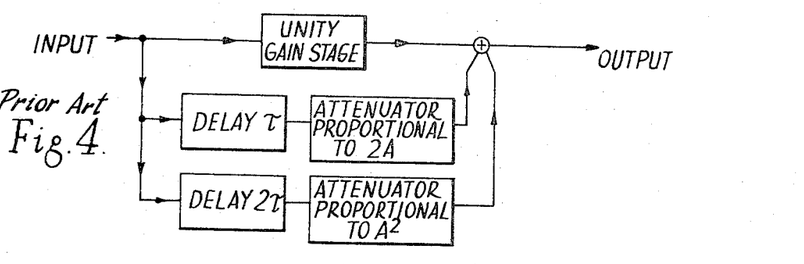
FIGURE 4 shows, purely diagrammatically, a system which can be used for attenuating multiple reflections, working on the feed-forward principle.

The feed-forward method of multiple attenuation is typified by that described by Sirks in U.S. specification No. 3,136,974. FIGURE 4 of the accompanying drawings illustrates the apparatus and FIGURE 5 the manner of its operation. This last illustration covers the case of multiple reflections in the sea: the case of a "ringing" seismic record.

Figure 5:
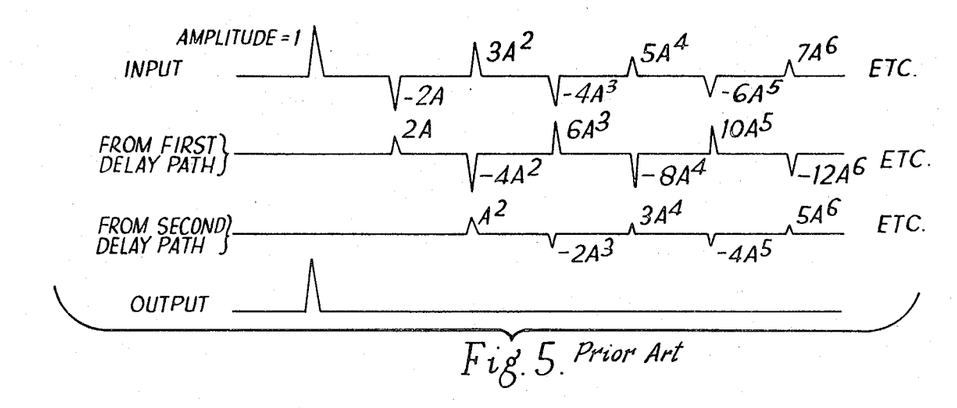
FIGURE 5 illustrates diagrammatically certain details of the operation of the system shown in FIGURE 4.

The first trace of FIGURE 5 represents, in simplified form, the elementary seismic pulse on a ringing record: the primary reflection (assumed to have a unit amplitude) is followed by a train of reverberations having amplitudes $(-A)^n(n+1)$; where $A$ is the reflection coefficient of the sea bottom and $n$ is the order of the reverberation. The second trace represents the signal supplied by the first delay path to the summing point, while the third trace represents that from the second delay path. The final output from the summing point includes only the original primary (as shown on the fourth trace).

Figure 2:
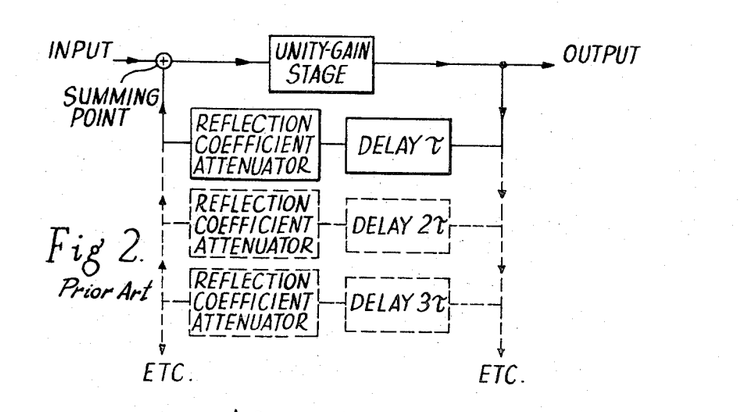
FIGURE 2 shows diagrammatically a system which can be used for attenuating multiple reflections, working on the feed-back principle.
Figure 3:
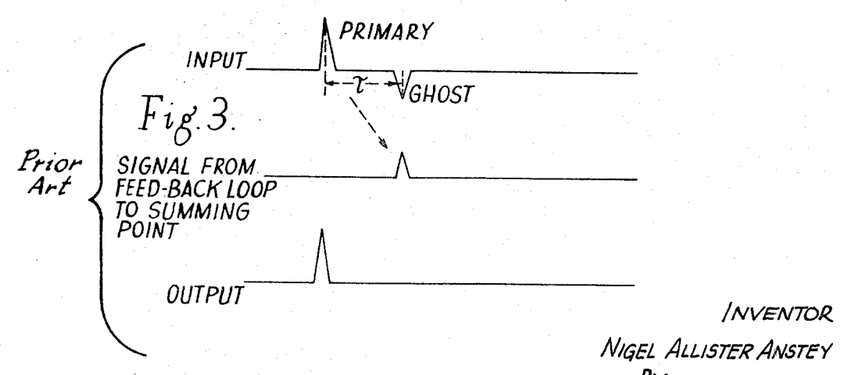
FIGURE 3 illustrates details of the operation of the system shown in FIGURE 2.

The feed-back method of multiple attenuation is typified by that described by Lindsey et al. in U.S. patent specification No. 3,070,777, for the case of ghost reflections from a reflector above the level of the seismic shot. FIGURE 2 of the accompanying drawings illustrates the apparatus and FIGURE 3 the manner of its operation. The method can be used for the attenuation of marine reverberations by the provision of a total of $m$ feedback paths, where $m$ is the order of the last significant reverberation; these extra paths are shown in broken lines in FIGURE 2. Both the feed-forward and the feed-back systems operate by the generation of "anti-multiples" which have exactly the correct time and amplitude to cancel the multiple reflections.

The feedback system, in the form shown, must provide a feed-back path for each order of reverberation, whereas the feed-forward system generates all the anti-multiples with two delay paths only. It is a corrollary of this fact that for marine reverberations where $m$ is large, the presence of non-reflected events (refractions, noise, etc.) is less serious when the feed-forward system is used.

For attenuating section multiples in the body of the earth, Watson (in U.S. Patent No. 3,131,375) proposed an extension of the feed-back system, in which one multiple reflection after another is separately identified and treated. Kunetz (Geophysical Prospecting, a publication of the Society of Exploration Geophysicists located in The Hague, Netherlands, September 1961, p. 317, and December 1963, p. 409) investigated a related iterative system by a digital method.

The foreknowledge required for operation of either technique (feed-forward or feed-back) is the reverberation times of the multiples and the effective reflection coefficients of the reflectors which generate the multiples.

For satisfactory attenuation of the multiples, these quantities must be known quite accurately. When the physical boundaries which generate the multiple reflections are well-defined, for example the surface and bottom of the sea, the reverberation time and the system reflection coefficient may be detremined precisely from the auto-correlation function of the seismic trace. In the body of the earth, however, the physical boundaries are seldom sufficiently separated or sufficiently discrete to allow the necessary information to be derived from a normal seismic record; the resolution of the record is inadequate. All prior-art methods for the attenuation of multiple reflections in the earth itself, therefore, have envisaged the inverse filtering of the seismic records as a necessary first step. However, any such method overlooks a viscous circle: before the inverse filtering one must establish the spectrum of the primary reflection signal, and this cannot be done on a record which is very rich in multiples.

The prior-art methods, being restricted to the treatment of one multiple-generating system at a time, are forced to employ digital technology in order to expedite the potentially enormous number of calculations. Digital technology, however, necessitates the sampling of time values and the quantization of amplitude values. The resolution with which this is done may be perfectly adequate, for all other purposes, but still inadequate for the generation of anti-multiples: this is because any error in timing or amplitude is multipled $n$ times when the $n$th-order anti-multiple is generated.

Another weakness of the prior-art methods is that they do not distinguish between general multiple reflections and peg-leg multiple reflections. Peg-leg multiples were first described by the present inventor (Geophysical Prospecting, June 1960, p. 242) and later elaborated by Trorey (Geophysics, a publication of the Society of Exploration Geophysicists located in Tulsa, Okla., December 1962, p. 766). They are a particular class of multiple reflections (exemplified by FIGURE 1c) which have the effect of imposing a slight delay on primary reflections, while causing a considerable increase in their effective amplitude. This increase in amplitude can be many-fold, and the seismic method, as we know it, would probably not work without them.

Figure 6:
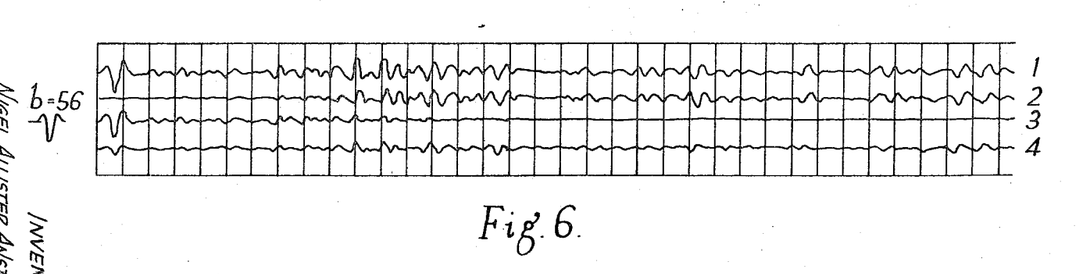
FIGURE 6 shows a synthetic seismogram which illustrates the effect of peg-leg reflections.

These facts are illustrated in FIGURE 6, which represents several steps in the calculation of a synthetic seismogram. The fourth trace of the suite represents the synthetic record obtained by considering primary reflections only, without transmission losses. The third trace represents primaries only, with transmission losses. The second trace represents multiples only, with transmission losses. The top trace is the complete synthetic record, representing both primaries and multiples, with transmission losses. The important point is that the major effect of the second trace (multiples only) is to delay and enhance the primary reflections, the increase of amplitude being sufficient to offset the transmission losses.

A most important conclusion emerges from this: in any attempt to remove multiple reflections, it is unwise to remove the peg-leg reflections. If the latter were removed, the ratio between primary reflections and noise would be so low that the primaries would be lost.

If then we decide to try to remove all multiples except the helpful peg-legs, we must stipulate a time within which a peg-leg helps the primary and beyond which it does not. Trorey calls this time the "transmission width," and guesses a value of 50 milliseconds; this is arbitrary, but probably sound. Then, if we are operating on a computer, we may program a distinction between helpful peg-legs and unhelpful peg-legs (see Judson, in Trorey's Appendix II). Another approach is based on the following argument:

The method of attenuating multiples by common-depth-point stacking is effective only for multiples which involve at least one bounce at or near the surface, so that we shall do no worse if we accept the same limitation; this limitation automatically diverts our attention away from all the significant peg-leg reflections. This means that in order not to remove the helpful peg-leg of FIGURE 7a, we also leave unaffected the unhelpful peg-leg of FIGURE 7b and the whole family of internal multiples typified by FIGURES 7c, 7d and 7e. However, any multiple path which involves the surface anywhere along its length (such as that shown at 7f, which is 7e with the addition of one surface bounce) is one we should hope to remove. In defending this we must note that the surface is always the most important multiple-generating interface, since its reflection coefficient is at least one order of magnitude higher than the vast majority of interfaces in the body of the earth.

According it is one object of the present invention to provide a method and means for the attenuation of multiple reflections without the long spreads and excessive field effort of the common depth point method.

It is another object of the invention to provide a method and means for the attenuation of multiple reflections which does not require inverse filtering as a preliminary step.

It is a further object to provide analogue means for the attenuation of multiple reflections, and so to avoid the sampling and quantizing errors associated with digital means.

It is a further object to provide methods and means for the attenuation of multiple reflections which take into account the special nature of peg-leg multiple reflections.

These objectives are realized, in the present invention, by the use of a correlator having included in it a reference signal which is obtained from the seismic signal itself reversed in time. This correlator is arranged in a feed back loop which is provided around an isolation stage.

For a better understanding of the invention reference should now be made to the following description, taken in conjunction with FIGURES 8 to 12 of the accompanying drawings.

In these drawings.

A method or process and apparatus for carrying out the present invention will first be generally described.

Figure 8:
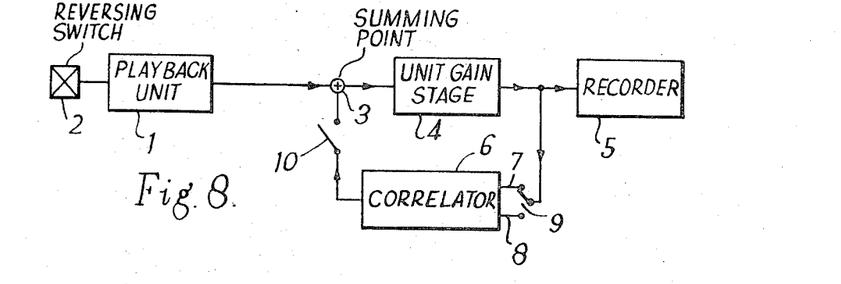
FIGURE 8 shows purely diagrammatically a system of the feed-back type which can be constructed and used in accordance with the present invention.

FIGURE 8 of the drawings illustrates, purely diagrammatically, a feed-back system which is similar to that shown in FIGURE 2, except that the component in the feedback path is a retrocorrelator. (Retro-correlation is the process of correlating two signals one of which is reversed in time.) Any real-time correlator can be used for this function, although we prefer to use the magneto-resistive correlator which is described in application Ser. No. 49,789 filed Apr. 21, 1965 and now abandoned. Such a correlator is illustrated in and will later be briefly described with reference to FIGURE 12 of the drawings.

The process has two stages. In the first stage, the connection from the feed-back loop to the summing point is broken, and the field trace is played backwards into the input; it is thereby recorded in the correlator as the reference trace. In the second part, the feed-back connection is restored and the field trace is again played into the input, forwards. The output is then a trace from which all multiple reflections involving the surface (of whatever order) have been removed.

We shall be content here with illustrating the process for the case of three reflectors and for only a short range of times.

Figure 9:
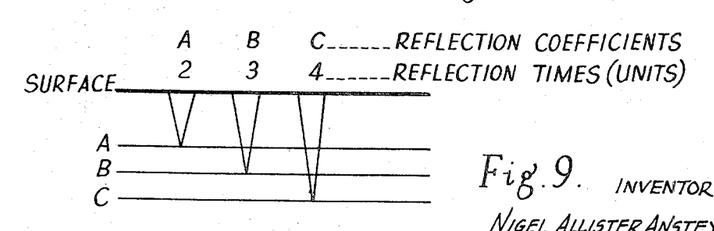
FIGURE 9 illustrates diagrammatically three primary reflections which might occur at three interfaces beneath the earth's surface.
Figure 10:
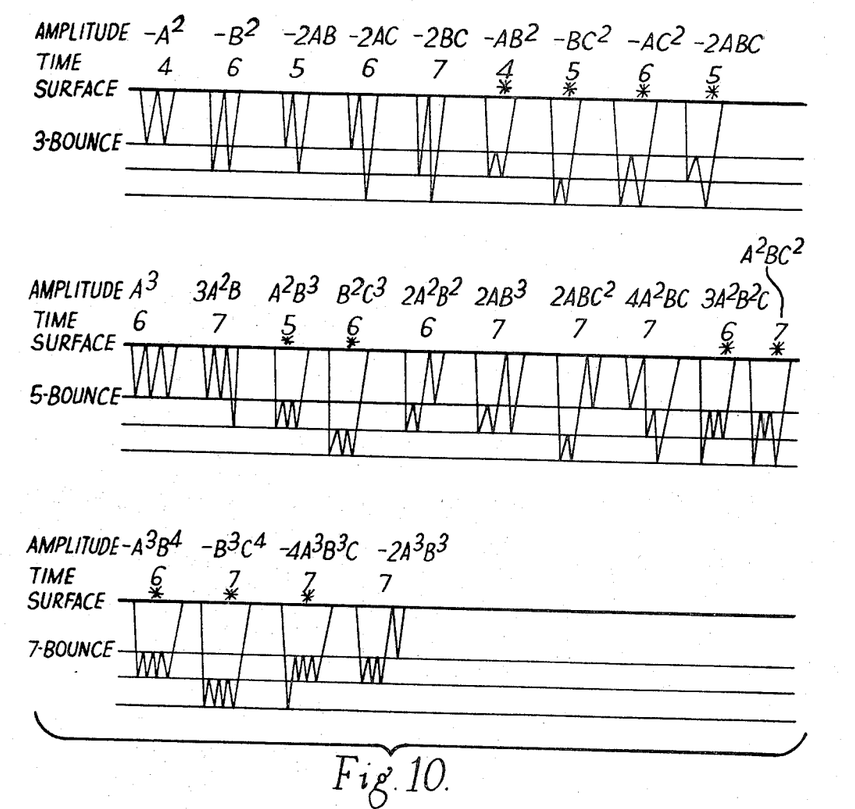
FIGURE 10 illustrates, again diagrammatically, all the multiple reflection paths which are possible with three such reflecting interfaces within seven units of time.

In FIGURE 9 we show the three primary reflections. The reflection coefficients of the three reflectors are A, B and C, so that, neglecting losses for the moment, the amplitudes of these reflections may be written as A, B and C: the reflection times are assumed to be 2, 3 and 4 units. Then FIGURE 10 displays all the multiple reflection paths which are established within the first 7 units of time. Above each sketch is the amplitude and time of the arrival associated with that path; the values for amplitude assume (for the moment) that the reflection coefficient of the surface is −1. There are, of course, an infinite number of multiple reflections between these four surfaces, but the ones shown are the only ones which arrive within 7 units of time; these are sufficient to show which reflections are attenuated and which are not. Where a multiple path is shown with a multiplier 2, 3 or 4, this signifies that there is a corresponding number of independent permutations of the path shown.

For any time value in the first 7 time units the corresponding total reflection amplitude can be obtained by adding the amplitudes of all events which arrive at that time value. Thus if one desires to know the amplitude at a time of 5 units, the amplitudes of all events in FIGS. 9 and 10 which have an arrival time of 5 units are added. This sum is $-2AB-BC^2-2ABC+A^2B^3$. Repeating this operation for the other times, a table can be constructed showing total reflection amplitude as a function of time, as follows:

| Time | Amplitude |
|---|---|
| 0 | |
| 1 | |
| 2 | A |
| 3 | B |
| 4 | $C-A^2-AB^2$ |
| 5 | $-2AB-BC^2-2ABC+A^2B^3$ |
| 6 | $-B^2-2AC-AC^2+A^3+B^2C^3+2A^2B^2+3A^2B^2C-A^3B^4$ |
| 7 | $-2BC+3A^2B+2AB^3+2ABC^2+A^2BC^2-B^3C^4-4A^3B^3C-2A^3B^5+4A^2BC$ |

This record is then the initial input to the proposed system; it is recorded backwards, that is, so that the time zero is laid down to coincide with the recording head in the correlator.

We now inject the input signal again, forwards, and proceed to retro-correlate. However, as the retro-correlation proceeds, the output from the correlator cancels some of the multiples in the input; therefore, as we do the retro-correlation we must remember that these removed multiples do not enter the correlator. The result of this feedback retro-correlation may be presented as a table showing the amplitude of the signal fed from the correlator to the summing point, as a function of time. This yields:

| Time | Amplitude |
|---|---|
| 0 | |
| 1 | |
| 2 | |
| 3 | |
| 4 | $A^2$ |
| 5 | $2AB$ |
| 6 | $2AC-2A^2B^2-A^3+B^2$ |
| 7 | $-3A^2B-2ABC^2-4A^2BC+2A^3B^3+2BC-2AB^3$ |

The final output of the process is then, for each arrival time, the sum of the input amplitude value given in the first table and the fed-back amplitude value given in the second table. Performing these additions, a tabulation of the final output as a function of time is obtained, as follows:

| Time | Amplitude |
|---|---|
| 0 | |
| 1 | |
| 2 | A |
| 3 | B |
| 4 | $C-AB^2$ |
| 5 | $-BC^2-2ABC+A^2B^3$ |
| 6 | $-AC^2+B^2C^3+3A^2B^2C-A^3B^4$ |
| 7 | $A^2BC^2-B^3C^4-4A^3B^3C$ |

Returning now to FIGURE 10, one sees which paths have been removed and which have not. Those which have not, as specified in the tabulation above, are marked with an asterisk in FIGURE 10. Clearly they represent all the internal multiples which never bounce off the surface, and they include the important peg-leg reflections typified by the last sketch (−2ABC) of the 3-bounce line.

Figure 7:
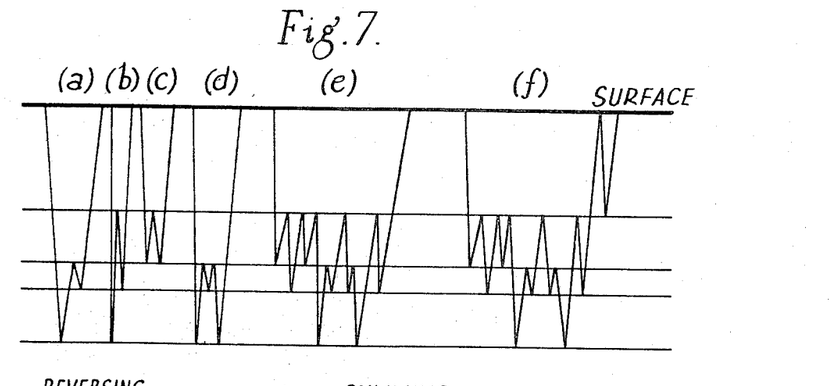
FIGURE 7 shows diagrammatically a number of seismic signals which have resulted from different multiple reflections at interfaces beneath the earth's surface.

Perhaps we should note specifically why it is that a reflection of the type of FIGURE 7f is removed completely (with all its permutations) while that of FIGURE 7e is not. For the very reason that the reflection identified as 7e is not removed, it appears at the output and enters the correlator. As it makes its way down the correlator, it generates therein all permutations of itself with every other multiple path, preferred to the surface as time origin. Thus every possible path starting at the right-hand end of FIGURE 7e is removed: FIGURE 7f is merely an illustration of the simplest one of these.

It should be noted also that the method does not require any knowledge of reflector spacing or reflection coefficients. All that is necessary is an initial adjustment of the correlator gain: thereafter the process of retro-correlation, in its own nature, produces the anti-multiples with the correct amplitude at the correct time.

The effective reflection coefficient of the surface can differ from −1 only by the action of near-surface absorption. In this case an appropriate reduction in the gain of the correlator allows an exact compensation of any value of surface reflection coefficient.

So far we have discussed reflections as if they were the simple spikes of FIGURE 5; in other words, we have implied perfectly inverse-filtered records. To become more realistic we can assign complex frequency responses $A(\omega)$ to the primary path to the first reflector, $B(\omega)$ to the path to the second reflector and $C(\omega)$ to the path to the third reflector. It can then be seen that a path which has an amplitude A3 (first sketch, 5-bounce line, of FIGURE 10) will be associated with a complex frequency response $(A(\omega))^3$, while a path which has, for example, an amplitude $4A^2BC$ (eighth sketch, 5-bounce line of FIGURE 10) will have a complex frequency response $$(A(\omega))^2 \cdot B(\omega) \cdot C(\omega)$$

In exactly the same way as that in which the correlator produces the correct amplitudes, therefore, it will produce the correct pulse shapes.

Let us consider in more detail the second example given above. The peg-leg reflection $-2ABC$ (last sketch, 3-bounce line of FIGURE 10) goes straight through from input to output of the system without any effect from the correlator; it is changed neither in amplitude nor in form. However, as it leaves the output it also enters the correlator, wherein it generates all its subsequent multiples. The first of these is with the first reflector (FIGURE 9); thus the interaction of $-2ABC$ with A produces in the correlator output the anti-multiple $-4A^2BC$ which is required to cancel the path $4A^2BC$ (eighth sketch, 5-bounce line of FIGURE 10). In the correlator this interaction is in fact a convolution of the $-2ABC$ pulse shape with the A pulse shape, thus ensuring that the anti-multiple has the correct form as well as the correct amplitude.

That the above argument really applies to the complex frequency response may easily be checked by assuming a particular dispersive characteristic in the earth and by verifying that the convolution disperses all the anti-multiples in the correct direction.

This result means that the system will operate on a field record; there is no requirement for inverse filtering. The only proviso here is that any filtering effect present in either the correlator or the field recording system must be small relative to that of the earth; in other words, the operation proceeds best with substantially unfiltered field tapes. For data recorded at sea, the effect of the finite depth of the geophone below the free surface of the water should be compensated by an appropriate inverse operator. Any amount of conventional filtering, of course, can be applied after the multiple-removing treatment.

In FIGURE 8, the reference 1 indicates a playback unit, which may be of a magnetic or any other suitable type. It is used to play back the reflected signal, which it feeds into the apparatus in which the signal is retro-correlated with itself. The direction of rotation of the playback unit 1 may be reversed by a conventional reversing switch 2.

From the summing point 3 the signal is fed through a unity-gain stage 4 to a recorder 5, in which the signal is recorded, after the effects of multiple reflections have been attenuated by the method of the invention.

The attenuation is produced by the correlator 6. This has two inputs 7 and 8 which are connected to the output of the stage 4 through a two-way switch 9. The output of the correlator 6 is fed back through a switch 10 to the summing point 3.

Figure 12:
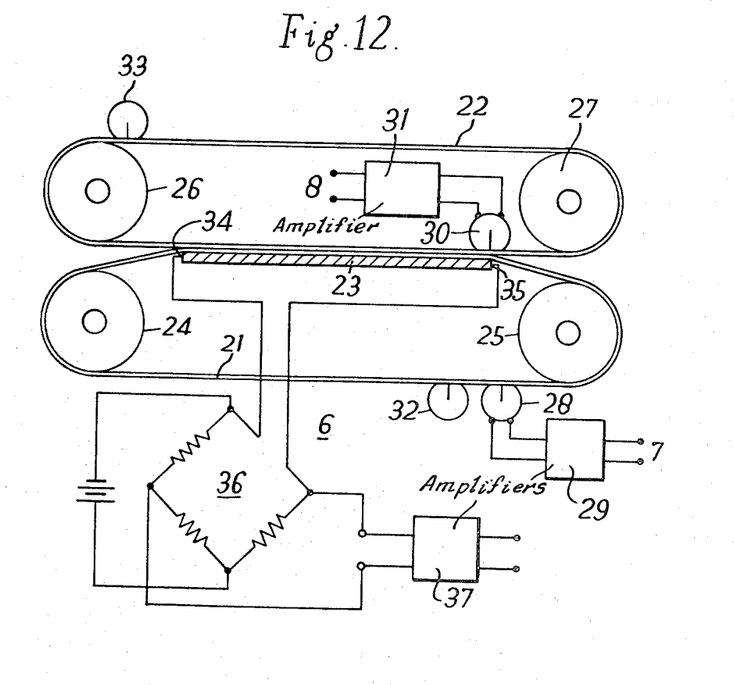
FIGURE 12 shows diagrammatically one form of correlator which may be used in carrying out the invention.

FIGURE 12 shows somewhat diagrammatically a correlator which may be used. This correlator is a magneto-resistive correlator, such as is more fully described in our aforesaid application Ser. No. 449,789.

This correlator includes two endless loops 21 and 22 formed of magnetic tape, which can be made to pass along a magnetoresistive correlating head 23. The construction and operation of this head are more fully described in our aforesaid application. The tapes are carried by two pairs of rollers 24, 25 and 26, 27, while the drives to the tapes may be imparted through these rollers or by other means.

The lower tape 21 is provided with a brake or clamp (not shown) by means of which its movement can be stopped, but the upper tape 22 normally cycles continuously.

The lower tape 21 is provided with a recording head 28, which is fed with the signal to be retro-correlated. This is done through an amplifier 29 the input 7 of which is connected to the switch 9 (FIGURE 8). Similarly the signal can be recorded on the tape 22 by means of a recording head 30. This head is supplied through an amplifier 31 the input 8 of which is connected to the other contacts of the switch 9. Erase heads 32 and 33 are provided for the tapes 21 and 22.

The output of the correlator 6, which is in the form of a voltage generated between the ends 34 and 35 of the head 23, is fed through a bridge circuit, indicated generally at 36, to an amplifier 37, the output from which is fed through the switch 10 (FIGURE 8) to the summing point 3.

The operation of the apparatus will be clear from the following description. With the switch 10 open and the switches 2 and 9 appropriately set, the signal from the unit 1 is fed through the stage 4 and amplifier 29 (FIGURE 12) to the head 28, by which it is recorded on the tape 21. This tape is moved to bring the recording over the magneto-resistive head 23 and is then stopped. The direction of this recording is reversed in time as compared with the direction of travel of the tape 22.

The switches 2 and 9 are now reversed and the switch 10 is closed. The playing unit 1 is again operated to feed the reflected signal to the apparatus. This signal is fed through the stage 4 to the recorder 5, while it is also fed back through the switch 9 to the input 8 of the correlator 6. It is here recorded on the tape 22.

Operation of the correlator then produces a retrocorrelated output which is fed back through the switch 10 to the summing point 3, where it is added to the input signal as has been described.

We shall turn now to a consideration of the errors, both of times and of amplitude, which may be encountered. First we shall discuss time errors.

In theory we must ensure that the time zero of the field record stored in the correlator is accurately aligned with the recording head; then we should have no systematic errors in the timing of the surface multiples. In practice, however, we must allow for an instrumental time delay in the recording of the seismic data. This delay can be estimated, for known recording equipment and probable seismic spectra, and the recording head of the correlator can be relocated by the corresponding number of milliseconds after the time break.

Next we must take account of the spread correction difficulty: for the very reason that the horizontal stacking method can be used to reduce multiples, a properly-corrected primary generates an anti-multiple which is not quite at the correct time. This means that only a trace near to the source can be subjected to a multiple-removal technique which applies from the surface down. When the process is applied to distant traces the near-surface multiples should not be considered (that is, the first part of the reference trace should be gated out). In practice, it is sometimes desirable to apply the multiple-removal process to the inside traces only, and then to establish continuity between shot-points by cross-correlating the intermediate traces against the treated inside traces.

The field record used as the input to the system will have been recorded with some form of time-variant gain control. Modern equipments allow the subsequent restoration of the signal to its full range of amplitudes. To see whether this is necessary or desirable, and to see what is the effect of errors in the amplitude of the generated anti-multiples, we must consider the mechanisms which govern the relation between record amplitude and time. These are:

(i) decay due to spherical spreading, which is proportional to the reciprocal of the distance travelled by the wavefront;

(ii) decay due to absorption in the earth;

(iii) decay due to transmission losses at the interfaces in the earth;

(iv) the compensating effect of the geophone pattern, which prejudice the shallow reflections and favour the deep reflections;

(v) differences in the reflection coefficients of the reflectors themselves (or, more exactly, differences in the amplitudes of the sum of primary and multiple reflections).

These mechanisms are worth some discussion.

(i) The decay due to spherical spreading has neither interest nor value, and we must compensate it. The required compensation is inversely proportional to the distance travelled by the wavefront.

Two facts emerge from this. First, it is not possitble to compensate primaries and multiples exactly, for the associated difference of average velocity means that primary and multiple events at the same time have travelled different distances. Our only possible course is to compensate on the basis of the primaries (that is, on the basis of the known velocity function) and to tolerate the resultant errors in the amplitudes of the multiples.

Second, since there is no interest in the data before the spherical spreading correction, the correction may be applied in the original field recording. The full implementation of this requires that the velocity function should be known before the field recording; this may not be acceptable, and it may be more convenient to apply a compensation inversely proportional to time in the field, and to increase this compensation according to depth in the office. If we take 0.1 second as the reference time, the programmed gain control should increase the amplitude 6 db at 0.2 second, 12 db at 0.4 second, 18 db at 0.8 second, 24 db at 1.6 seconds, 30 db at 3.2 seconds and 36 db at 6.4 seconds. These figures are entirely practical.

Because of the fact that it is not possible to provide accurate spherical spreading compensation for both primaries and multiples, errors of up to perhaps 20% must be expected in the amplitude of generated anti-multiples.

(ii) The decay due to the absorption in the earth is fully accommodated by the multi-removal process, as discussed earlier, and no compensation for this decay is required.

(iii) In the illustration of the method given earlier, we ignored transmission losses. Review of this material shows that the action of the method is correct either if there are no transmission losses or if they are preserved faithfully. Thus, we should not attempt to compensate for the decay due to transmission losses.

In fact, it is not possible to compensate transmission losses. For example, the $-2BC$ multiple of FIGURE 10 suffers six transmission losses, while the $3A^2B$ multiple suffers only two; neither of these paths has of necessity the same transmission loss as that encountered by the primary which arrive at the same time.

(iv) We have said that we shall confine most of our interest to traces near the source: in this case the effect of the geophone patterns on the amplitude of early reflections is negligible, and no compensation is required.

(v) The amplitudes of the reflections themselves, of course, are the basic raw material of the method, and definitely should not be compensated.

From this we conclude that the records used as input to the systems should ideally be recorded without any gain control other than that required to compensate spherical spreading. If any other recording gain program is used, the recorded data should be restored to the condition of having been corrected for spherical spreading only.

The effect of errors in the amplitudes of the antimultiples is that the multiples appear at the output of the systems reduced (or even reversed) but not eliminated. These remanent multiples then enter the feedback loop, and go round again. Thereafter spurious signals appear at the output, and these become more and more numerous until finally the output goes wild. However, we must stress that this effect occurs much later and to a less marked degree than is the case with the prior-art methods. This is for three reasons:

(i) the fact that no attempt is made to remove the peg-leg reflections means that the primaries remain at their high (peg-leg-reinforced) amplitudes, and so take longer to become buried under spurious signals;

(ii) each anti-multiple is derived from a previous observed reflection, and is not subject to errors associated with the definition of that reflection; thus we generate the anti-multiple for FIGURE 7f from the observed reflection of FIGURE 7e, without incurring any errors associated with the construction of the path of 7e;

(iii) we have no sampling or rounding-off errors.

In the matter of equipment, this multiple-removing or attenuating system of the invention is inexpensive; it requires only a magneto-resistive or other suitable correlator and a simple amplifier, which are connected and operated in a novel manner to carry out the invention. It would also be possible to use a digital computer.

The adjustments are confined to the setting of the record head of the correlator in order to compensate instrumental delay, and to an adjustment of the correlator gain to optimize the removal process. This latter adjustment is directed towards the optimum balancing of the residual errors in the amplitude of the generated anti-multiples, and to compensation of the fact that the reflection coefficient of the free surface may not be actually $-1$.

The criterion for the correlator gain adjustment is provided by a second magneto-resistive correlator which may be used either to display the auto-correlation of the output signal or the cross-correlation of output and input signals. The better the removal of multiples, the lower are the amplitudes on each side of the central maximum of the auto-correlation function, and the greater is the difference of amplitudes on the two sides of the central maximum of the cross-correlation function. Thus a second correlator can be used to give a quantitative measure of the effectiveness of the multiple-removal process, and the gain-control program and/or the correlator gain setting may be varied to optimize this effectiveness. Economically, therefore, the method is competitive with horizontal stacking of manifold field recordings.

Thus far, we have confined our attention to multiples involving the surface. There is, of course, the possibility of removing surface multiples as a first stage, and then repeating the removal process for progressively deeper and deeper upper reflectors. However, this possibility is limited in its scope; it begins to require inverse filtering, and it begins to remove the peg-leg multiples. Therefore the most important application of the present invention is its ability to attenuate multiples involving the surface.

Finally we should add a note about noise. Clearly anything which is not a reflection will go round and round the feedback loop. This sounds more undesirable than it really is. The first break, of course, must be suppressed. Wind-noise at the end of the record is of no importance; it is only necessary to ensure (as is normal) that the amplitude of the last reflection of interest is well above the wind-noise. Shot-generated noise and surface waves during the body of the record are more serious, but it is usually true that multiple reflections assume paramount importance only when the records are good (that is, when shot-generated noise and surface waves are small). The fact that little or no filtering may be used during the field recording does not degrade the final record appearance, for noise components outside the reflection spectrum will remain outside the spectrum while they reverberate in the system, and they may be removed by ordinary filtering at the end of the process.

Any signal which circulates in the feedback loop identifies itself as noise. Conversely, any signal which has been reflected from depth in the earth bears the signature of multiple reflections at shallower levels. These facts furnish the basis of the best possible distinction between signals (that is, reflections from depth) and noise (anything else).

Figure 11:
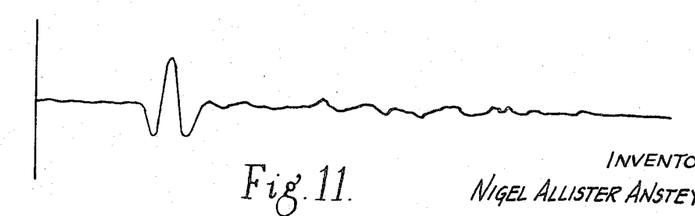
FIGURE 11 illustrates a signal which might be received during a well geophone survey.

We may illustrate this in its application to well geophone surveys. With the advent of the Vibroseis system ("Vibroseis" being a registered trademark) and the lock-in well geophone, we are able (for the first time) to obtain a well survey record which is restricted to compressional wavelets observed with zero phase. Such a record might appear as in FIGURE 11, where the initial seismic pulse is followed by a background of multiple reflections from above the geophone and of direct and multiple reflections from below.

If we make many records at progressive increments of depth down the well, and if we stack these together with static corrections appropriate to the indicated vertical velocity (that is, so that the initial pulses are aligned), then we preserve the down-going multiple reflections and destroy the reflections from below. We now have a multiple-reflection-signature for the earth above the well geophone.

By performing a simple retro-correlation on this, we obtain the signature for any pulse which has been transmitted downwards through this section, reflected at any depth below it, and transmitted upwards through it back to the surface. Any reflection from below the section has this form as its basic pulse shape. The thicker the section, the longer the signature and the higher the amplitude of its later parts.

Now we know that correlation against the normal form of elementary seismic pulse is not a strong method of improving the signal-to-noise ratio; the pulse is too short. With the inclusion of the effect of multiple paths in the first few thousand feet, however, our basic pulse becomes perhaps 0.5 second in length. If we take a seismic reflection record across the well, and cross-correlate each trace against our new multiple signature, we should be able to obtain significant improvements in the signal-to-noise ratio of the record.

This example may not be an important one from the practical point of view. It is included mainly because it is a simple illustration of the fact that multiple reflections can be used as a means of discriminating between reflection signal and noise.

I claim:
1. Apparatus for obtaining from a first wave containing a primary reflection signal and a plurality of multiple reflections, a second wave in which at least some of the multiple reflections are attenuated, said apparatus comprising correlating means, means for applying a signal derived from the first wave to said correlating means, means for producing a reference representing at least a portion of the first wave reversed in time, said correlating means including means for correlating said pattern and said signal to obtain a correlation output, and means responsive to said output and said first wave for attenuating the multiple reflections in order to develop said second wave.

2. Apparatus for seismic exploration of the earth's formations comprising means for generating seismic waves in the earth, means for detecting said waves and developing therefrom a first wave containing at least one primary reflection produced by reflection of said seismic waves from a sub-surface formation together with one or more multiple reflections produced by reflection of said seismic waves from more than one sub-surface interface, means for deriving a signal from the first wave, and correlating means including structure for correlating the latter signal with at least a portion of the same signal reversed in time, thereby to synthesize said multiple reflections.

3. The apparatus defined by claim 2 which further includes means for comparing the result of the correlation with at least a portion of the first wave.

4. Apparatus for producing from a reflected signal which includes a number of multiple reflections a record of that signal in which at least some of the multiple reflections have been attenuated, which apparatus includes:
 (a) a signal path for said reflected signal and including input and output terminal means,
 (b) a correlator having first and second input connections and an output connection such that a signal produced at the output connection represents a finite cross-correlation function of signals applied to the said input connections,
 (c) means for applying a signal representing the reflected signal reversed in time to a first one of said input connections,
 (d) a feedback loop around said path between said output terminal means and said input terminal means, the feedback path from the said output terminal means to said input terminal means being formed through the second one of the said input connections to the output connection of said correlator, and
 (e) means for recording the resulting signal which is produced at the output terminal means.

5. Apparatus according to claim 4, in which the said correlator includes:
 (a) a correlating head of extended length formed of a magnetoresistive material,
 (b) first and second magnetic recording media,
 (c) means for recording a signal representing the reflected signal on one of the said media and bringing this recorded medium into position along the said head, and
 (d) means for causing the second recording medium to travel along the said head.

6. Apparatus for producing from a reflected signal which includes a number of multiple reflections a record of that signal in which at least some of the multiple reflections have been attenuated, which apparatus includes:
 (a) a signal path for said reflected signal and including input and output terminal means,
 (b) correlating means including a pattern which represents the reflected signal reversed in time,
 (c) means for establishing a feedback loop around said path between said output terminal means and said input terminal means, the said correlating means being included in the feedback path between said output terminal means and said input terminal means, and
 (d) means for recording the resulting signal appearing at said output terminal means.

7. Apparatus according to claim 6, in which the said correlating means include:
 (a) a correlating head of extended length formed of a magnetoresistive material,
 (b) first and second magnetic recording media,
 (c) means for recording a signal representing the reflected signal on one of the said media and bringing this recorded medium into position along the said head, and
 (d) means for causing the second recording medium to travel along the said head.

8. A method of producing from a reflected signal which includes a number of multiple reflections a record of that signal in which at least some of the multiple reflections have been attenuated, which method includes the steps of:
 (a) passing said reflected signal through a signal path including an input and an output,
 (b) providing correlating means,
 (c) producing in said correlating means a reference pattern which corresponds to the waveform of at least a portion of the reflected signal reversed in time,
 (d) establishing a feedback loop around said path from said output to said input, said correlating means being included in the feedback path between said output and input,
 (e) utilizing said correlating means to provide a correlation signal representing the correlation between the reference pattern and the signal at said output,
 (f) feeding the reflected signal to said input,
 (g) applying said correlation signal to said input simultaneously with said reflected signal, and
 (h) producing a record of the resulting output obtained at said output.

9. A method of obtaining from a first wave containing a primary reflection signal and a plurality of multiple reflections, a second wave in which at least some of the multiple reflections are attenuated, said method including the steps of applying an electrical signal derived from the first wave to a correlating means, using said means to correlate said signal with at least a portion of the first wave reversed in time to produce a correlation output signal, and using the correlation output signal to attenuate at least some of said multiple reflections in the first wave.

10. The method defined by claim 9 wherein the using step includes the step of comparing the result of the correlation with at least a portion of said first wave.

11. A method of obtaining from a first wave containing a primary reflection signal and a plurality of multiple reflections a second wave in which at least some of the multiple reflections are attenuated, said method comprising the steps of producing a reference pattern representing a time reversed version of at least a portion of said first wave, applying at least a portion of said first wave to a correlating means, using said correlating means to correlate the latter applied wave portion with said reference pattern to obtain correlation output, and utilizing said output to obtain said second wave.

12. A method of obtaining from a first wave containing a primary reflection signal and a plurality of multiple reflections a second wave in which at least some of the multiple reflections are attenuated, said method comprising the steps of producing a reference pattern representing at least a portion of said first wave, applying at least a portion of said first wave to a correlating means, using said correlating means to correlate the latter applied wave portion with said reference pattern to obtain an output, one of said reference patterns and the wave correlated therewith being reversed in time with respect to the other, and utilizing the correlation output and said first wave to obtain said second wave.

13. A method of obtaining from a first wave containing a primary reflection signal and a plurality of multiple reflections a second wave in which at least some of the multiple reflections are attenuated, said method comprising the steps of applying the first wave through an electrical circuit having input and output terminals and including a feedback path extending around said circuit and between said terminals for feeding back from said output terminals to said input terminals signals passed through said circuit, feeding back at least a portion of the second wave through the feedback path, during the feeding back using a correlating means to correlate the fed back wave against a reference signal representing a time reversed version of at least a portion of said first wave, and applying the result of the correlation to the input terminals of said circuit thereby to attenuate said some multiple reflections so that the result derived from said output terminals represents the second wave.

14. A method of obtaining from a first wave containing a primary reflection signal and a plurality of multiple reflections a second wave in which at least some of the multiple reflections are attenuated, said method comprising the steps of applying the first wave through an electrical circuit having input and output terminals and including a feedback path extending around said circuit and between said terminals for feeding back from said output terminals to said input terminals signals passed through said circuit, feeding back at least a portion of the first wave through the feedback path, during the feeding back using a correlating means to correlate the fed back wave against a reference signal representing at least a portion of said first wave, one of said reference signals and the fed back wave being reversed in time, and applying the result of the correlation to said input terminals of said circuit.

15. Apparatus for producing from a first wave including a primary reflection and a number of multiple reflections, a second wave having at least some of the multiple reflections attenuated, said apparatus including correlating means, means for applying to said correlating means a first signal derived at least in part from the first wave, said correlatnig means including means for correlating the latter signal against a reference signal representing a time reversed version of at least a portion of said first wave to provide an output, and means responsive to said output for producing said second wave.

16. The apparatus defined by claim 15 wherein the correlating means includes a correlating head of extended length formed of magnetoresistive material, first and second magnetic recording media, means for recording the reference signal on one of said media, said one medium being disposed adjacent said head, means for recording said latter signal on the second medium, and means for moving the second medium adjacent the head and the first medium.

17. Apparatus for producing from a first wave including a primary reflection and a number of multiple reflections, a second wave having at least some of the multiple reflections attenuated, said apparatus including a circuit having input and output terminal means and means providing two paths of travel for signals between said terminals, said first wave being supplied to said input terminal means for passage via one of said paths to said output terminal means, the other of said paths including correlating means, means for applying to said correlating means a first signal derived at least in part from the first wave, said correlating means including means for correlating the latter signal against a reference signal representing a time reversed version of at least a portion of said first wave to provide an output, and means for supplying said output to one of said terminal means simultaneously with said first wave.

18. The apparatus defined by claim 17 wherein the correlating means includes a correlating head of extended length formed of magnetoresistive material, first and second magnetic recording media, means for recording the reference signal on one of said media, said one medium being disposed adjacent said head, means for recording said latter signal on the second medium, and means for moving the second medium adjacent the head and the first medium.

19. In a method of seismic exploration of the earth's formations, the steps of generating seismic waves in the earth, obtaining from said seismic waves a first wave containing at least one primary reflection produced by reflection of said seismic waves from a subsurface formation together with one or more multiple reflections produced by reflection of said seismic waves from more than one interface, obtaining a signal from the first wave, applying the latter signal to a correlating means, and using said correlating means to correlate said latter signal with at least a portion of the same signal reversed in time in order to synthesize the multiple reflections.

20. The method defined by claim 19 including the further step of comparing the result of the correlation with at least a portion of the first wave to identify the multiple reflections.

References Cited

UNITED STATES PATENTS

| | | |
|---|---|---|
| 2,854,191 | 9/1958 | Raisbeck. |
| 2,864,072 | 12/1958 | Blake. |
| 3,061,813 | 10/1962 | Geyer. |
| 3,108,249 | 10/1963 | Clement ____________ 340—15.5 |
| 3,136,974 | 6/1964 | Sirks ______________ 340—15.5 |
| 3,209,317 | 9/1965 | Webster. |
| 3,273,113 | 9/1966 | Lerwill et al. _______ 340—15.5 |
| 3,281,776 | 10/1966 | Ruehle ____________ 340—15.5 |

(Other references on following page)

UNITED STATES PATENTS 3,114,884 12/1963 Jakowatz.
3,182,256 5/1965 Andrew.

OTHER REFERENCES

Smith, A Review of Methods of Filtering Seismic Data, Geophysics, vol. 23, No. 1, January 1958, pp. 44–57.

RODNEY D. BENNETT, *Primary Examiner.*
D. C. KAUFMAN, *Assistant Examiner.*

U.S. Cl. X.R.

235—181; 343—100.7